US010388173B2

(12) United States Patent
Durand

(10) Patent No.: US 10,388,173 B2
(45) Date of Patent: Aug. 20, 2019

(54) COLLISION AVOIDANCE SYSTEM FOR AIRCRAFT GROUND OPERATIONS

(71) Applicant: ROSEMOUNT AEROSPACE INC., Burnsville, MN (US)

(72) Inventor: William Durand, Edina, MN (US)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 994 days.

(21) Appl. No.: 14/084,409

(22) Filed: Nov. 19, 2013

(65) Prior Publication Data

US 2014/0142838 A1 May 22, 2014

Related U.S. Application Data

(60) Provisional application No. 61/728,005, filed on Nov. 19, 2012.

(51) Int. Cl.

| | |
|---|---|
| ***G05D 1/00*** | (2006.01) |
| ***G08G 5/04*** | (2006.01) |
| ***G08G 5/00*** | (2006.01) |
| ***G08G 5/06*** | (2006.01) |

(52) U.S. Cl.

CPC ............ *G08G 5/04* (2013.01); *G05D 1/0083* (2013.01); *G08G 5/0021* (2013.01); *G08G 5/045* (2013.01); *G08G 5/065* (2013.01)

(58) Field of Classification Search

CPC ...... G01C 23/00; G01C 21/00; G01C 21/165; G01C 21/34; G01C 21/3691; G01C 21/3697; G01C 5/005; G08G 5/0021; G08G 5/045; G08G 5/065; G01S 5/021; G01S 13/584; G01S 13/87; G01S 13/93; G01S 13/94; G01S 17/89; G01S 2013/9335; G01S 5/0289; G01S 7/4802; G01S 7/4813

See application file for complete search history.

(56) References Cited

U.S. PATENT DOCUMENTS

| | | | | |
|---|---|---|---|---|
| 8,019,529 | B1 * | 9/2011 | Sharma et al. | 701/117 |
| 8,761,991 | B1 * | 6/2014 | Ferguson | G05D 1/0088 340/917 |
| 9,261,879 | B2 * | 2/2016 | Ferguson | G05D 1/0088 |
| 2003/0122666 | A1 * | 7/2003 | John et al. | 340/539.13 |
| 2004/0056952 | A1 * | 3/2004 | Konya | 348/117 |
| 2004/0059497 | A1 * | 3/2004 | Sankrithi | 701/120 |

(Continued)

FOREIGN PATENT DOCUMENTS

| | | | |
|---|---|---|---|
| EP | 1470967 | A1 | 10/2004 |
| EP | 1787142 | A1 | 5/2007 |

(Continued)

OTHER PUBLICATIONS

European Search Report for Application No. 13193413.5-1802, dated Jun. 21, 2017, 7 pages.

*Primary Examiner* — Truc M Do

(74) *Attorney, Agent, or Firm* — Cantor Colburn LLP

(57) ABSTRACT

A ground collision avoidance system (GCAS) for an aircraft is disclosed. A radio frequency (RF) sensor senses a location of an obstacle with respect to the aircraft moving along the ground. An expected location of the obstacle with respect to the aircraft is determined from the sensed location and a trajectory of the aircraft. An alarm signal is generated when the expected location of the obstacle is less than a selected criterion.

15 Claims, 5 Drawing Sheets

(56) References Cited

U.S. PATENT DOCUMENTS

| | | | | |
|---|---|---|---|---|
| 2005/0109872 | A1* | 5/2005 | Voos et al. | 244/3.17 |
| 2007/0219720 | A1* | 9/2007 | Trepagnier | B60W 30/00 701/300 |
| 2008/0062011 | A1* | 3/2008 | Butler et al. | 340/961 |
| 2008/0243383 | A1* | 10/2008 | Lin | 701/213 |
| 2009/0174591 | A1* | 7/2009 | Cornic et al. | 342/29 |
| 2010/0106356 | A1* | 4/2010 | Trepagnier | G01S 17/023 701/25 |
| 2010/0225522 | A1* | 9/2010 | DeMersseman | G01S 7/03 342/72 |
| 2010/0292871 | A1* | 11/2010 | Schultz et al. | 701/3 |
| 2010/0305857 | A1* | 12/2010 | Byrne et al. | 701/301 |
| 2012/0081236 | A1 | 4/2012 | Best et al. | |
| 2013/0253754 | A1* | 9/2013 | Ferguson | G05D 1/0231 701/28 |
| 2013/0321176 | A1* | 12/2013 | Vasek et al. | 340/945 |
| 2014/0062756 | A1* | 3/2014 | Lamkin | G08G 5/0021 342/29 |

FOREIGN PATENT DOCUMENTS

| | | | |
|---|---|---|---|
| EP | 1843173 | A1 | 10/2007 |
| WO | 2006027762 | A1 | 3/2006 |

* cited by examiner

COLLISION AVOIDANCE SYSTEM FOR AIRCRAFT GROUND OPERATIONS

BACKGROUND

The present disclosure claims priority from U.S. Provisional Patent Application Ser. No. 61/728,005, filed on Nov. 19, 2012.

The present disclosure relates to aircrafts and, more specifically, to systems and methods to aid flight crews in avoiding obstacles while the aircraft is moving on the ground.

Aircraft are required to operate in two different environments, on the ground and in the air. While on the ground (e.g., while at an airport) aircraft need to be moved around to position them for takeoff as well as for other reasons such as maintenance, storage, passenger loading/unloading and the like. However, aircraft are designed, primarily, to optimize their flight, not their ground based operations. This can lead to cases on the ground, especially with wide body aircraft, where the aircraft crews have poor situational awareness of the aircraft and its dimensions due to limited visibility. Thus, the crew is limited in their ability to judge clearance of the aircraft with respect to obstacles on the ground, which may be numerous at unimproved airports in some countries.

SUMMARY

According to one embodiment of the present disclosure, a ground collision avoidance system (GCAS) for an aircraft is includes a radio frequency (RF) sensor for sensing a location of an obstacle with respect to the aircraft moving along the ground; and a processor configured to: determine an expected location of the obstacle with respect to the aircraft from the sensed location and a trajectory of the aircraft, and generate an alarm signal when the expected location of the obstacle is less than a selected criterion, thus posing a collision threat to the aircraft.

In another embodiment of the present disclosure, a method of preventing a collision of an aircraft includes: sensing, using a radio frequency (RF) sensor, a location of an obstacle with respect to the aircraft moving along the ground; determining an expected location of the obstacle with respect to the aircraft from the sensed location and a trajectory of the aircraft, and generating an alarm signal when the expected location of the obstacle is less than a selected criterion.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

On large airplanes (such as the Boeing 747, 757, 767, and 777; the Airbus A380; and the McDonnell Douglas MD-10 and MD-11), the pilot cannot accurately judge positions of the airplane's wingtips from the cockpit unless the pilot opens the cockpit window and extends his or her head out the window, which is often impractical. One approach to avoiding such a problem is to include a ground collision avoidance system (GCAS). However, in some cases obstacles that are collision threats may go undetected by the GCAS. Also, if a GCAS provides too many false alarms ("false positives") when evaluating the threat of collision with an obstacle, the crew may begin to ignore or disable the system.

Embodiments disclosed herein integrate electromagnetic obstacle sensing with effective signal processing to detect a threat of collision of an object, such as an airplane, with an obstacle with a high probability of collision, or in other words, with a low incidence of false alarms ("false positives"). Detected collision threats trigger an alert to an autonomous crew with sufficient lead time for the crew to take avoidance actions safely. The system is effective in both day and night conditions and in degraded environmental conditions. The system is safe to operate in an airport environment and does not impact either onboard or ground electronic systems.

Figure 1:
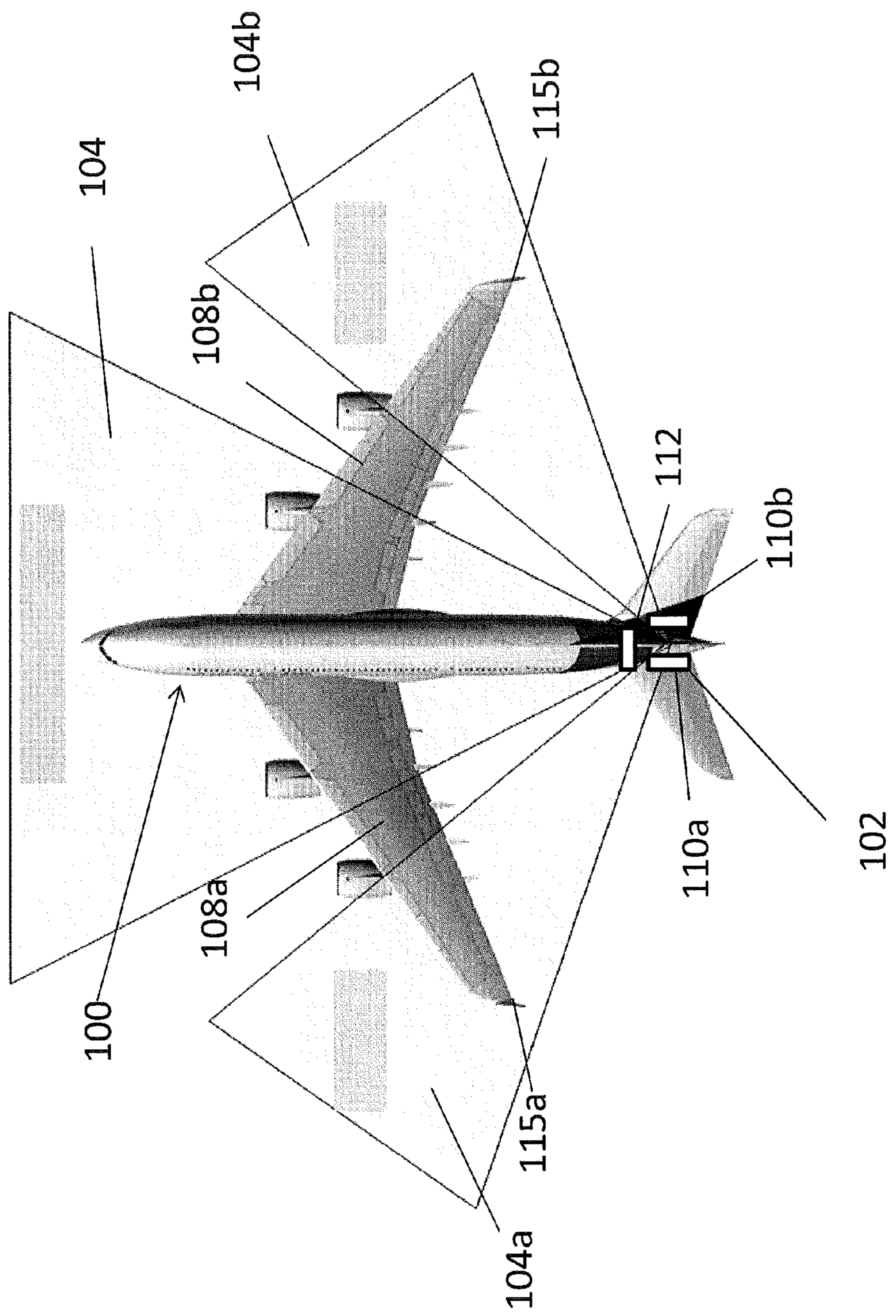
FIG. 1 shows an aircraft having a ground collision avoidance system (GCAS) in one embodiment of the present disclosure.

FIG. 1 shows an aircraft 100 having a GCAS in one embodiment of the present disclosure. The aircraft includes sensors 110*a*, 110*b* and 112 disposed on a tail 102 of the aircraft 100. In one embodiment, the tail 102 may include a sensor 110*a* on a left side of the aircraft 100 that has a left wingtip view 104*a*, or in other words, a field-of-view that covers a volume of space near a wingtip 115*a* of the left wing 108*a* of the aircraft 100. Similarly, sensor 110*b* on a right side of the aircraft 100 has a right wingtip view 104*b* or a field-of-view that covers a volume of space near the wingtip 115*b* of the right wing 108*b* of the aircraft 100. The tail 102 may further include a sensor 112 that includes a view along a fuselage of the aircraft 100. In various embodiments, the left side sensor 110*a* and the right side sensor 110*b* may include a radio frequency (RF) sensor such as a transducer for transmitting and receiving radar signals at one or more frequencies. Sensor 112 may be a camera or other device for recording optical images. However, sensor 112 may also be an RF frequency sensor in various embodiments.

Figure 2:
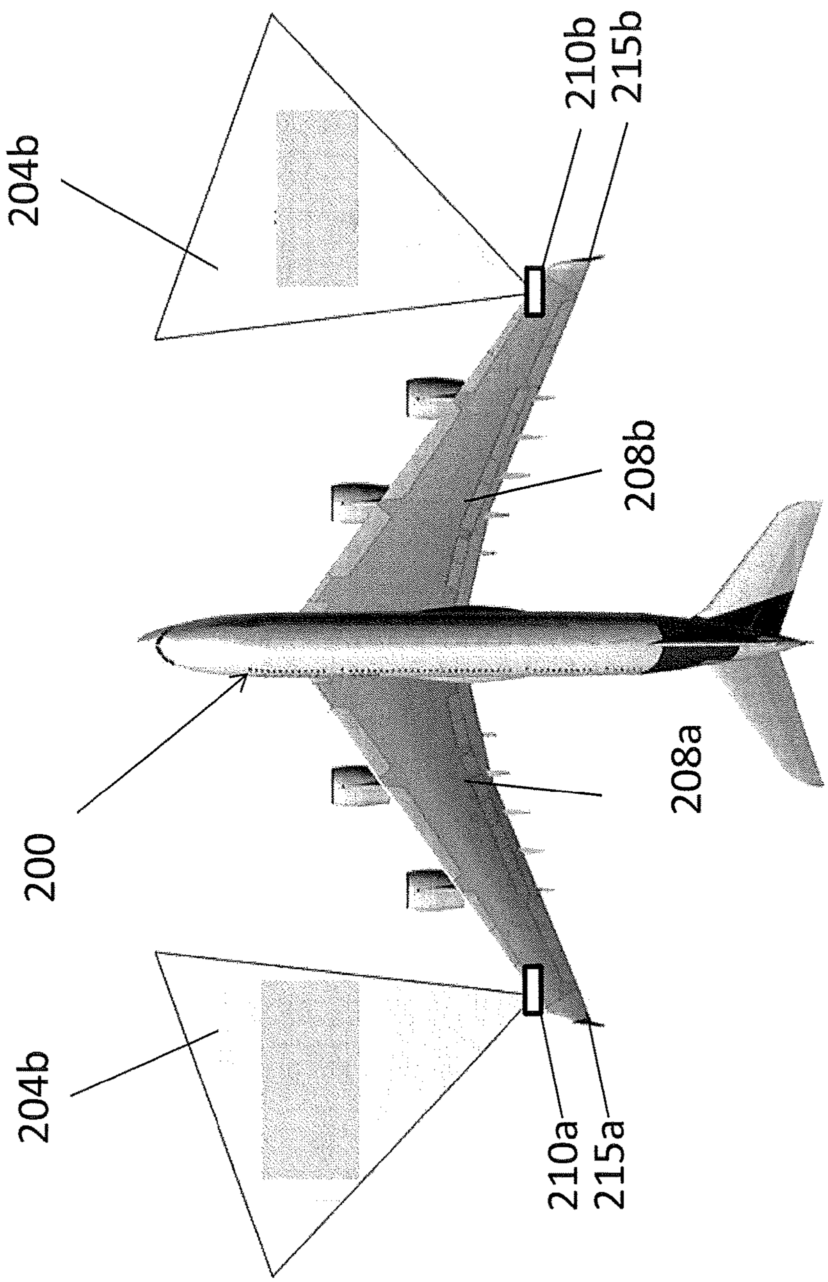
FIG. 2 shows an aircraft having a GCAS in another embodiment of the present disclosure.

FIG. 2 shows an aircraft 200 having a GCAS in another embodiment of the present disclosure. Sensors 210*a* and 210*b* are provided in wings 208*a* and 208*b*, respectively, of the aircraft 200. Sensors 210*a* and 201*b* may be RF sensors such as transducers for obtaining radar signals. The field-of-view for sensors 210*a*, 210*b* show the volumes of space in front of wingtips 215*a* and 215*b*, respectively. A sensor for displaying a front view such as the front view 106 of FIG. 1 is not shown for clarity but may be provided, for example, by a sensor located in the tail 102 as in FIG. 1.

Figure 3:
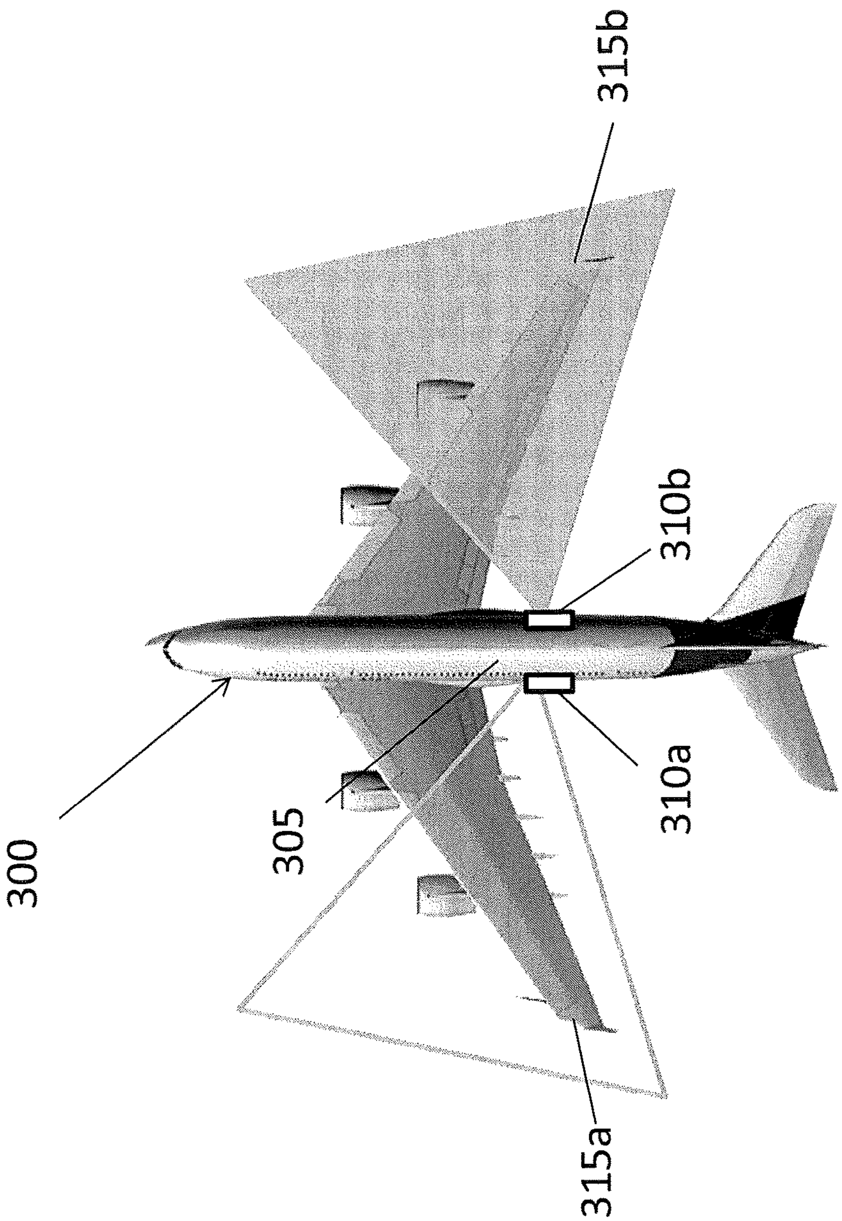
FIG. 3 shows an aircraft having a GCAS in yet another embodiment of the present disclosure.

FIG. 3 shows an aircraft 300 having a GCAS in yet another embodiment of the present disclosure. Sensors 310*a* and 310*b* are mounted on a fuselage 305 of the aircraft 300. Sensors 310*a* and 301*b* may be RF sensors such as transducers for obtaining radar signals. Sensor 310*a* may be oriented to have a field-of-view that shows the volume of space in front of wingtip 315*a*. Sensor 310*b* may be oriented to have a field-of-view that shows the volume of space in front of wingtip 315*b*. Although not shown, a sensor for displaying a front view of the aircraft 300 may be provided, such as the front view 106 of FIG. 1. Sensor fields of view may be widened to include a forward view along the fuselage to detect objects in the taxi direction as well.

In prior GCAS's, only a single type of sensor (e.g., video cameras, imaging infrared (IIR) or ultrasonic cameras) were provided. In embodiments disclosed herein, a GCAS is provided that includes not only prior sensor types but also radar sensors to increase the breadth of data available for processing and collision alarm decision making. Data fusion across multiple sensors may increase decision quality under many conditions. Also, multiple radar technologies may be included. For instance, Ultra Wideband (UWB) radars may be integrated with Frequency Modulated Continuous Wave (FMCW) units to improve obstacle detection performance at both short and long ranges.

The radar sensors described herein may be low power, high performance radio frequency devices. If an obstacle is present within the radar field of view, the reflection of the transmitted signal from the obstacle is received by the sensor. In one embodiment, a monostatic radar configuration uses the same antennas for transmitting and receiving signal energy. In another embodiment, a multistatic configuration may use multiple antennas to characterize obstacle geometries. Both configurations may be employed in a single system.

Transmitted radar energies need to be safe for humans nearby the sensor, but sufficient to detect distant obstacles. The maximum range required will be determined by aircraft taxi speed, crew response time and safe aircraft stopping distances. In one embodiment, the radars can support taxi speeds up to 30 knots.

According to one embodiment, the radar sensors are capable of detecting obstacles greater than 4 centimeters in size. Obstacles of particular collision risk in airport taxi environments include: airfield fence posts/poles; airfield lighting; taxiway markings; housing structures; other aircraft; ground vehicles; and ground personnel to name but a few. As discussed briefly above, the sensors (e.g., radar antennas/modules) may be mounted at various locations on the aircraft including the wingtip(s), fuselage, and radome (aft of weather radar antenna). The radar employs a beam width suitable for detecting obstacle collision threats, while ignoring obstructions that are not a threat to the aircraft.

Figure 4:
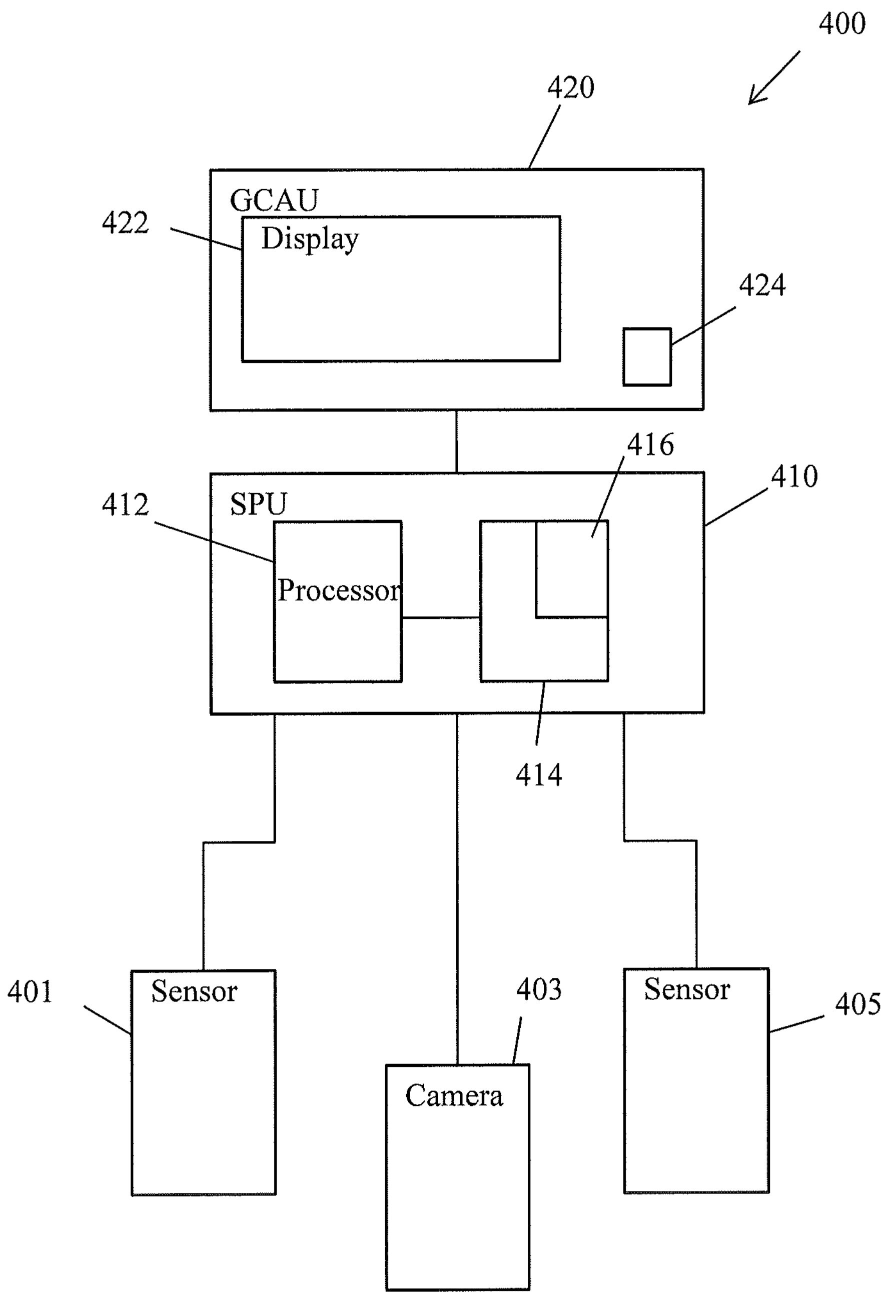
FIG. 4 shows an illustrative GCAS system according to one embodiment.

FIG. 4 shows an illustrative GCAS system 400 according to one embodiment. The system 400 includes sensors 401, 403 and 405. The sensors 401 and 403 may represent RF sensors such as the RF sensors shown in FIGS. 1-3. Sensor 403 may be a camera or visual sensor. Sensors 401, 403 and 405 are coupled to a Signal Processing Unit (SPU) 410 and provide information regarding obstacle range and position to the Signal Processing Unit (SPU) 410. The sensors 401, 403 and 405 may provide the information either wirelessly or via a wired connection. The SPU 410 includes a processor 412 and a memory device 414. The memory device 414 may be a non-transitory memory device, such as a RAM or ROM device or other suitable memory device. The memory device 414 may be suitable for storing various data that may be used in the GCAS system 400 as well as various data that is obtained from the sensors 401, 403 and 405 or from calculations performed at processor 412. In addition, the memory device 414 may include one or more programs 416 or set of instructions that are accessible to the processor 412. When accessed by the processor 412, the one or more programs 416 enable the processor 412 to perform the methods disclosed herein for avoiding collision with an obstacle while on the ground.

The processor 412 performs various calculations in order to determine a presence of an obstacle and to perform a decision-making algorithm to determine a probability of collision with the obstacle. In one embodiment, the processor 412 may match radar signals to obstacle shape templates through a correlation process in order to identify an obstacle presence, type, shape, etc. The processor may apply adaptive noise filters which characterize noise energy and attenuate the noise energy accordingly, and then normalize a noise floor in order to establish an effective obstacle detection threshold. The processor 412 may further employ threshold filters which identify radar return signals sufficiently above the noise floor and report these signals as representing obstacles that are potential collision threats. Multiple radar signals or scans may be stacked in order to enhance a signal-to-noise ratio of the obstacle. The potential collision threat may be mapped to a range and azimuth location around the aircraft and to their motion relative to the aircraft.

The processor 412 may also group radar signals meeting predetermined obstacle criteria and enter them as "objects" into tracking files. Each tracking file can be repeatedly tested for temporal persistence, intensity, rate of change of intensity and trajectory to help differentiate objects as obstacles that are collision threats, other obstacles, false alarms or background clutter. Once a persistent obstacle collision track has been established, the processor determines distance to the aircraft and issues an appropriate alarm or warning signal. If the tracks persist and grow as range decreases, the process performs a decision-making program to declare the tracks a probable collision and issues an alarm or warning.

The SPU 410 therefore executes data fusion algorithms, processes obstacle information, together with critical aircraft dynamics such as groundspeed, heading, and aircraft position to compute obstacle closing velocity and predict if a collision is probable. If a collision is predicted, the SPU 410 sends a signal to the GCAS Crew Alerting Unit (GCAU) 420 which then alerts the pilot to the potential collision.

Various data may be sent to a GCAU 420 which may be an interface in a cockpit of the aircraft or which is otherwise accessible to crew of the aircraft. The various data may then be presented at the GCAU 420 to the crew in order to inform the crew of any obstacles that may be within a vicinity of the aircraft and capable of causing mechanical or structural damage to the aircraft.

In one embodiment, the GCAU 420 may include a screen or display 422 for providing a visual image to the crew. The visual image may include a representative image of an obstacle in relation to a part of the aircraft such as a wingtip. The display 422 may also show other data relevant to a distance between the aircraft and the obstacle and/or to an action for avoiding or preventing a collision. The GCAU 420 may further include an audio alarm 424 that may provide an audible signal in order to alert the crew to the possibility of colliding with an obstacle. Additionally, a visual cue such as a flashing light at the display 422 may be used to alert the crew of the possibility of collision. The GCAU 420 may provide system health information and indicates the operational status of the system. The GCAU 420 may also provide a means for the fight crew to disable the system. In one embodiment, the GCAU 420 is mounted in the cockpit, in the field of view of both the pilot and the first officer, and provides flight crew interface with the GCAS.

In operation, the GCAS disclosed herein may operate as follows: while taxiing, the flight crew identifies an obstacle approaching but can't visually determine if it will clear the aircraft (frequently the wingtip) (alternately, the crew may not identify an obstacle due to decreased visibility conditions or high workload situation); the pilot slows the aircraft while approaching the obstacle and monitors the GCAU 320 mounted in the cockpit; the GCAS continually monitors distance to the obstacle; if the GCAS predicts the aircraft will collide with the obstacle, it issues an alert and the pilot stops the aircraft or implements other evasive action preventing the collision; if stopped, the pilot determines the appropriate maneuver before continuing to taxi the aircraft; and if the GCAS predicts the aircraft will not collide with the obstacle, then no alert is issued and the crew continues taxiing.

Figure 5:
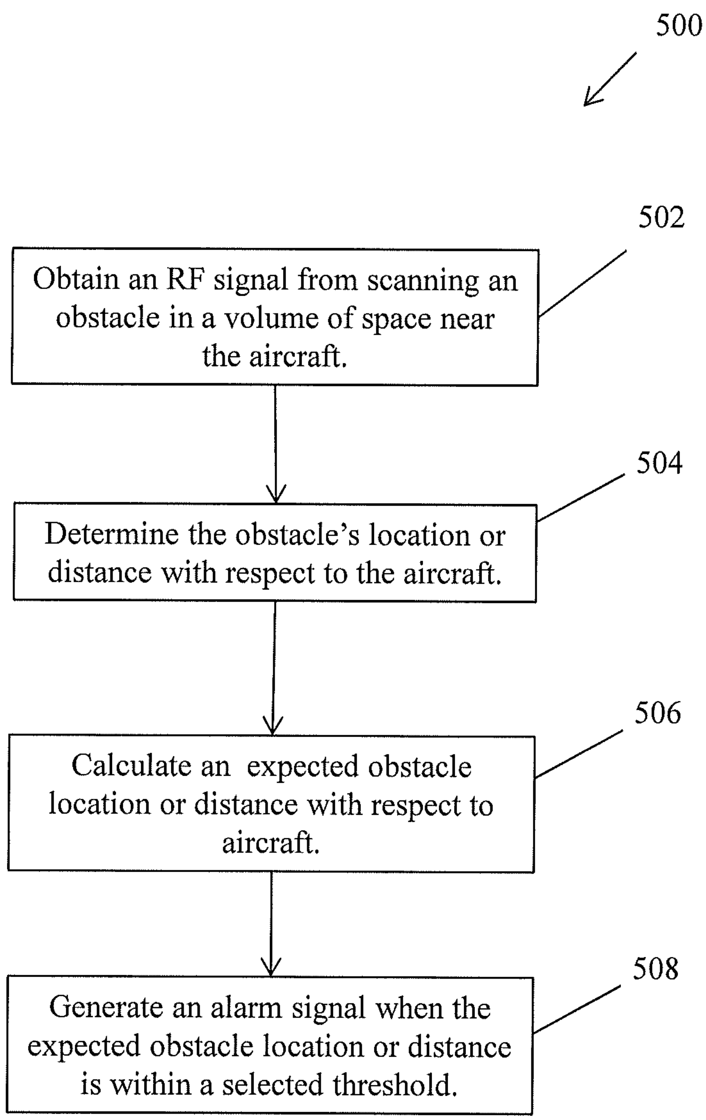
FIG. 5 shows a flowchart illustrating a method of avoiding a ground collision according to an embodiment.

FIG. 5 shows a flowchart 500 illustrating a method of avoiding a ground collision according to an embodiment. In block 502, one or more signals are obtained from the RF sensors, wherein the signals are indicative of obstacles and their location with respect to the aircraft. In block 504, the one or more signals are used to determine a location or distance of the obstacle with respect to the aircraft or a part of the aircraft such as a wingtip. In block 506, the determined location of the obstacle is used to determine an expected location or distance of the obstacle with respect the aircraft. In various embodiments, the one or more signals may be signals taken over a selected time period. Therefore, the location of the obstacle may be determined at several times during the selected time period and a trend of the obstacle's location over time may be used to determine a trajectory and/or velocity of the obstacle with respect to the aircraft. The determined trajectory and/or velocity of the obstacle may then be used to determine the expected location of the obstacle at a selected later time.

In block 508, the expected location of the obstacle at the later time is compared to a selected threshold and if the expected location is within the selected threshold, an alarm may be generated to alert the crew. A suitable threshold may be 10 meters or 20 meters, so that if the obstacle is forecast to come within this distance of the aircraft or a wingtip of the aircraft, the alarm is generated. The threshold is adjusted with respect to aircraft taxiing speeds to allow for a safe deceleration and stopping distance. The threshold may also be selected so that a possibility of false positive collision forecasting is reduced or minimized.

Also, a probability of collision with the obstacle may be determined based on current trajectory of the aircraft, current trajectory of the obstacle, etc. If the determined probability of collision is greater than a selected probability threshold, the alarm may be generated. The level of the probability threshold may be selected so as to reduce of minimize the occurrence of a false alarm. When an alarm is generated, the alarm may continued to be heard or displayed until either the aircraft has stopped or the threat of collision is no longer imminent or the system is deactivated. To minimize the potential for false positive alarms, the system may be used only when the aircraft is on the ground and/or taxiing.

In various embodiments, the obstacle may be tracked by the control unit and the tracking of the obstacle may be displayed at the screen of the user interface 420. The tracking may employ a loop between blocks 502 and 504 in order to obtain the obstacle's location at various times. In various embodiments, an obstacle that is being tracked and/or monitored using one sensor, such as sensor 112 of FIG. 1 may be "handed off" to another sensor, such as sensor 110*b* of FIG. 1 as the obstacle passes out of the field-of-view of the sensor 112 and into the field-of-view of sensor 110*b*.

In one embodiment, Ultra Wideband (UWB) radars may be integrated with Frequency Modulated Continuous Wave (FMCW) units to improve GCAS performance at both short and long obstacle detection ranges. Sensor units can have both radar types included therein, although either radar may be used alone or with other sensors to construct a GCAS. Signal processing methods and algorithms will differ between radar types and methods of fusing data between the radars and other sensors will add complexity. Radar signal processing methods may include, but are not limited to, wavelet correlation which searches for signals characteristic of obstacle reflections and amplifies them while attenuating random noise, matching radar signals to obstacle shape templates through a correlation process, where high correlation helps rapidly identify obstacle presence and type/shape (e.g., light poles, etc.), adaptive noise filters which characterize noise energy and attenuate signals accordingly, then normalize the noise floor and help establish an effective obstacle detection threshold, threshold filters which identify radar return signals sufficiently above the noise floor and report these signals as representing obstacles that are potential collision threats, tracking of obstacles by their motion relative to the aircraft and combining adjacent signals with similar tracks into clusters for continued observation and subsequent mapping, and mapping potential collision threats to range and azimuth around the aircraft and to their motion relative to the aircraft for further understanding of collision potential.

In one embodiment, FMCW (e.g., 77 GHz) radar sensor alone with such advanced signal processing supports an effective GCAS capability. Many 77 GHz FMCW radars include integral scanning capability, enabling obstacle location mapping in both range and azimuth relative to the aircraft and they can track multiple obstacles simultaneously with rapid response to aircraft and obstacle motion (measurements repeated in milliseconds).

In other embodiments, the RF sensor(s) may operate within a short-wave infrared range (from about 0.9 micrometers (μm) to about 1.7 μm), mid-wave/long-wave infrared range; (from about 3 μm to about 14 μm), a millimeter wave range (from about 1 millimeter (mm) to about 1 centimeter (cm)), an ultra-wide band range (from about 1 mm to about 1 cm), and any other suitable frequency range of the electromagnetic spectrum.

While the systems and methods disclosed herein has been discussed with respect to an aircraft, it is understood that the systems and methods may apply also to any object or vehicle moving along the ground.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the exemplary embodiment to the disclosure has been described, it will be understood that those skilled in the art, both now and in the future, may make various improvements and enhancements which fall within the scope of the claims which follow. These claims should be construed to maintain the proper protection for the disclosure first described.

What is claimed is:

1. A ground collision avoidance system (GCAS) for an aircraft, the system comprising:

a radio frequency (RF) sensor for sensing a radar signal from an obstacle and a location of the obstacle with respect to the aircraft as the aircraft moves along the ground; and a processor that, in operation:

identifies the obstacle using the radar signal and an obstacle shape template;

tracks the obstacle to determine a temporal persistence of the obstacle;

determines an expected location of the obstacle with respect to the aircraft from the sensed location and a trajectory of the object; and generates an alarm signal when the expected location of the obstacle with respect to the object is less than a selected criterion.

2. The system of claim 1, wherein the obstacle has a velocity and trajectory, and the processor is further:

determines the velocity and trajectory of the obstacle; and determines the expected location of the obstacle using a determined velocity and trajectory of the obstacle.

3. The system of claim 1, wherein the RF sensor is located on the aircraft at least one of: (i) at a tail of the aircraft; (ii) at a wing of the aircraft; and (iii) at a fuselage of the aircraft.

4. The system of claim 1, wherein the RF sensor is a radar transducer.

5. The system of claim 1, wherein the RF sensor operates in at least one of: (i) a short-wave infrared range; (ii) a mid-wave infrared range; (iii) a long wave infrared range; (iv) a millimeter wave range; (v) an ultra-wide band range; and (vi) a frequency modulated continuous wave.

6. The system of claim 1, further comprising a camera configured to provide an image to the processor, wherein the processor is configured to use signals from both the camera and the RF sensor to determine the expected location of the obstacle.

7. The system of claim 1, wherein the processor also tracks the location of the obstacle with respect to the aircraft.

8. The system of claim 1, wherein the processor determines probability of collision between the object and the aircraft, and generates the alarm signal when the determined probability is greater than a selected threshold value.

9. A method of preventing a collision of an object, the system comprising:

sensing, using a radio frequency (RF) sensor, a radar signal from an obstacle and a location of the obstacle with respect to an aircraft as the aircraft moves along the ground;

identifies the obstacle using the radar signal and an obstacle shape template;

tracking the obstacle to determine a temporal persistence of the obstacle;

determining an expected location of the obstacle with respect to the aircraft from the sensed location and a trajectory of the aircraft, and generating an alarm signal when the expected location of the obstacle with respect to the aircraft is less than a selected criterion.

10. The method of claim 9, wherein the obstacle has a velocity and trajectory, the method further comprising:

determining the velocity and trajectory of the obstacle and determining the expected location of the obstacle using a determined velocity and trajectory of the obstacle.

11. The method of claim 9, wherein the RF sensor is located on the aircraft at least one of: (i) at a tail of the aircraft; (ii) at a wing of the aircraft; and (iii) at a fuselage of the aircraft.

12. The method of claim 9, wherein the RF sensor operates in at least one of: (i) a short-wave infrared range; (ii) a mid-wave infrared range; (iii) a long wave infrared range; (iv) a millimeter wave range; (v) an ultra-wide band range; and (vi) a frequency modulated continuous wave.

13. The method of claim 9, further comprising:

providing a visual image from a camera disposed on the aircraft and determining the expected location of the obstacle using both the image from the camera and a signal from the RF sensor.

14. The method of claim 9, wherein further comprising tracking the location of the obstacle with respect to the aircraft.

15. The method of claim 9, further comprising:

determining a probability of collision between the object and the aircraft, and generating the alarm signal when the determined probability is greater than a selected threshold value.

* * * * *